Figure 1:
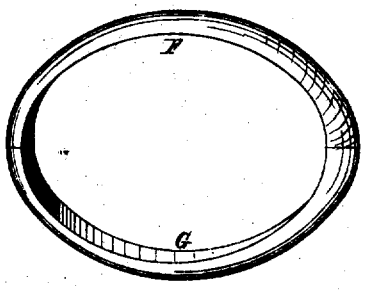

F. M. SWEET.

Bracelets.

No. 5,311. Reissued March 4, 1873.

WITNESSES.

Edwin C. Pierce

Thomas F. Cogswell

INVENTOR.

Francis M. Sweet per Roy P. Thurston atty

AM. PHOTO-LITHOGRAPHIC CO. N.Y. (OSBORNE'S PROCESS)

UNITED STATES PATENT OFFICE

FRANCIS M. SWEET, OF NEWARK, NEW JERSEY, ASSIGNOR TO DAVID D. CODDING, ARTHUR E. CODDING, AND THERON I. SMITH.

IMPROVEMENT IN BRACELETS.

Specification forming part of Letters Patent No. 21,381, dated August 31, 1858; extended seven years; reissue No. 5,311, dated March 4, 1873.

*To all whom it may concern:*

Be it known that I, FRANCIS M. SWEET, formerly of the city of Syracuse, in the county of Onondaga and State of New York, and now of Newark, New Jersey, did invent a new and useful Improvement in Bracelets for the Wrist; and it is hereby declared that the following specification, taken in connection with the drawing making a part of the same, is a full, clear, and exact description thereof.

The nature of the invention consists in providing hollow metallic bracelets with an elastic connection of rubber or metal spring, so arranged as to admit of the enlargement of the bracelet to pass over the hand, and closing the same upon the wrist, and holding the parts together by the contraction of the rubber or spring, as hereinafter described.

A convenient way to construct the improved bracelets is to take a soldered tube and draw it through a plate having its opening of the form desired to give the bracelet; fill the tube with resin or other material to keep it in form while bending, and form it upon an oval block; cut the tube so that each piece will make one-half the bracelet; remove the filling; and to the ends of one-half it will be advisable, but is not necessary, to attach guides or guards to pass into corresponding ends of the other half. These guards are attached for the purpose of preventing side movement of the parts when drawn together. Pass a rubber cord through the two parts and connect the ends together so that the cord will be on a strain when the two parts of the bracelet are in contact. The cord must be sufficiently elastic to permit the opening of the parts sufficiently to pass over the hand to the wrist.

Figure 2:
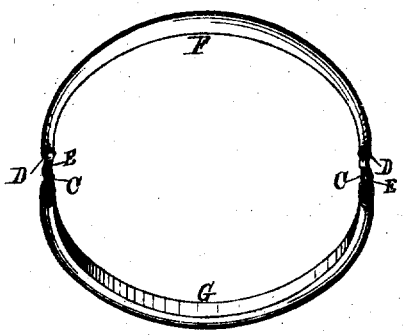

In the drawing, Figure 1 represents a bracelet closed. Fig. 2 shows the two parts F and G separated, and having guides C attached to one part, which enter into the hollow D of the other. These guides may be made in any form, either as shown in the drawing or made of a short section of a tube soldered to the ends of one part, and of the size of the opening in the ends of the other part.

Figure 3:
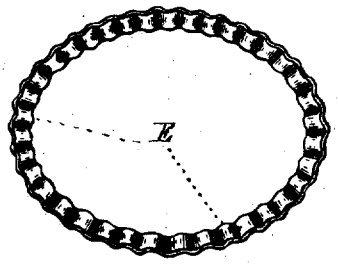

Fig. 3 represents a piece of gum-elastic cloth, E, which may be passed into the hollow of the parts, as above stated. A wire spiral spring may be used instead of the rubber. The elastic connection operates, by its lengthwise contraction, to bring the parts of the bracelet together and hold them in contact.

By constructing bracelets in this manner the usual joint and clasp are dispensed with and the cost of manufacturing greatly lessened.

The use of an elastic cord or band for the purpose of stringing loose pieces of jet or beads is not claimed, as such are in common use; but

What is claimed as my invention, and desired to be secured by Letters Patent, is—

A bracelet composed of two parts, F and G, made hollow and shaped to the contour of the wrist, and held together by an elastic rubber or spring connection, as described, the whole article being substantially as described.

Witnesses: FRANCIS M. SWEET.

EDWARD MARTIN,

JOSEPH P. KIESLING.